Jan. 3, 1933.  I. A. WEAVER  1,892,919
VEHICLE WHEEL BRAKE TESTER
Filed May 9, 1931   6 Sheets-Sheet 5

Patented Jan. 3, 1933

1,892,919

UNITED STATES PATENT OFFICE

IRA A. WEAVER, OF SPRINGFIELD, ILLINOIS, ASSIGNOR TO WEAVER MANUFACTURING COMPANY, OF SPRINGFIELD, ILLINOIS, A CORPORATION OF ILLINOIS

VEHICLE-WHEEL BRAKE TESTER

Application filed May 9, 1931. Serial No. 536,185.

The present invention relates to novel features of construction, resulting in functional advantages, in appliances for testing the brakes of vehicle-wheels.

One object of the invention is to provide an apparatus of this character which will operate with greater accuracy than will those which have heretofore been on the market and in use.

A further aim is to supply a brake-tester that can be manufactured economically and in which the parts are very accessible, the appliance permitting the entire performance of the brake testing operation to be completed in a few seconds.

Another design of the invention is to furnish a machine for testing all of the brakes of an automobile simultaneously and indicating the braking effort applied to the individual wheels, the indicating or recording devices being so arranged or grouped together that they represent the four wheels of the car, whereby the braking action on each separate wheel may be quickly determined and easily and readily compared with that of any one or more of the other wheels.

Such recording means allows one to detect promptly the percentage of error in the equalization of the braking force or energy applied to the two front or to the two rear wheels.

The improved and novel testing machine is so constructed that the vehicle to undergo the brake examination or trial may be driven on to it from either of opposite directions, and the wheel or traction plates with which the vehicle-wheels contact are equipped with automatic, interlocking mechanism so that the plates are locked against a reverse movement from their central positions, which is essential due to the fact that the brakes of the front or rear axles may be worn until they have little holding power while the wheels are rolling forwardly but which possess considerable braking action when the car moves rearwardly.

Thus, for example, the front plates might have little forward movement on account of the brakes of the front wheels thereon being worn, so that they will not hold when the car is moving forwardly, but such plates might have considerable movement on the return action due to the brakes holding well while the car is being pulled backwardly by the return of the rear wheel plates to their normal position, thereby presenting a false reading for the front wheel brakes.

Such detrimental result is prevented by the plate locking means referred to.

A supplemental aim of the invention is to supply a device of this type employing a liquid-indicator, associated with cylinders and their pistons for raising the liquid-levels in graduated-tubes to indicate the extent or amount of the braking efforts which the brakes apply to the wheels when the test is taking place, the pistons moving downwardly in their cylinders during the testing operation, which construction permits simplicity in structure and greater accuracy in the indication.

An added purpose of the invention is to provide a brake-tester having graduated tubes with indicating liquid therein corresponding in number to the wheels undergoing test, so that the levels of the liquid in the various tubes will individually show the braking force applied to the wheels of the vehicle, and all in association with means to assure that the liquid in all tubes will be at zero graduations before the test is started.

Moreover, this invention aims to provide the recording or indicating means with a liquid which rises in the graduated, transparent tubes, the liquid being displaced by pistons operating in the cylinders, the top openings of which are as high as, or higher than, the liquid in the tubes at their zero positions, thereby eliminating any packing or piping that would be necessary if the cylinder mechanism were arranged below the zero level in the recording device.

In accordance with the principles of the invention, means may also be provided to return the liquid automatically to the zero graduations in the several indicating tubes as the car is driven off of the machine, the arrangement being such that the liquid is quickly restored to zero readings by the return of the pistons which tend to produce vacua.

To the accomplishment of these and other desirable objects, a present, preferred embodiment of the invention has been produced, and it is illustrated in the accompanying drawings, forming a part of this specification and to which reference should be made in connection with the following detailed description.

For simplicity, like reference numerals have been employed throughout the several views of the drawings to designate the same structural parts.

In these drawings:—

Figure 2:
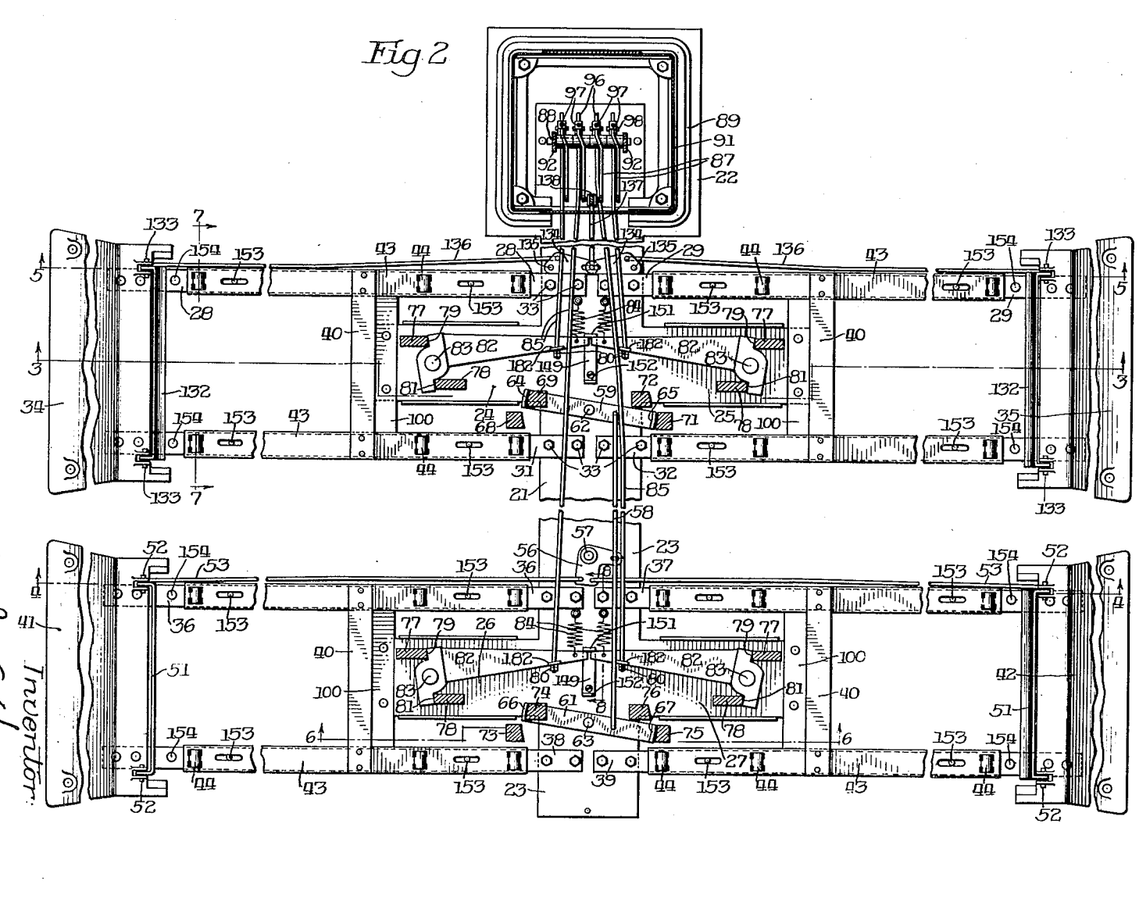
Figure 2 is an enlarged, horizontal section through the tester with the various cover-plates withdrawn to show the operating mechanism more fully.
Figure 3:
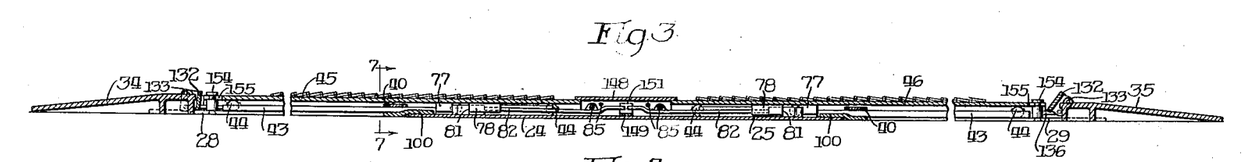
Figure 3 is a longitudinal, vertical section on line 3—3 of Figure 2.
Figures 9, 13:
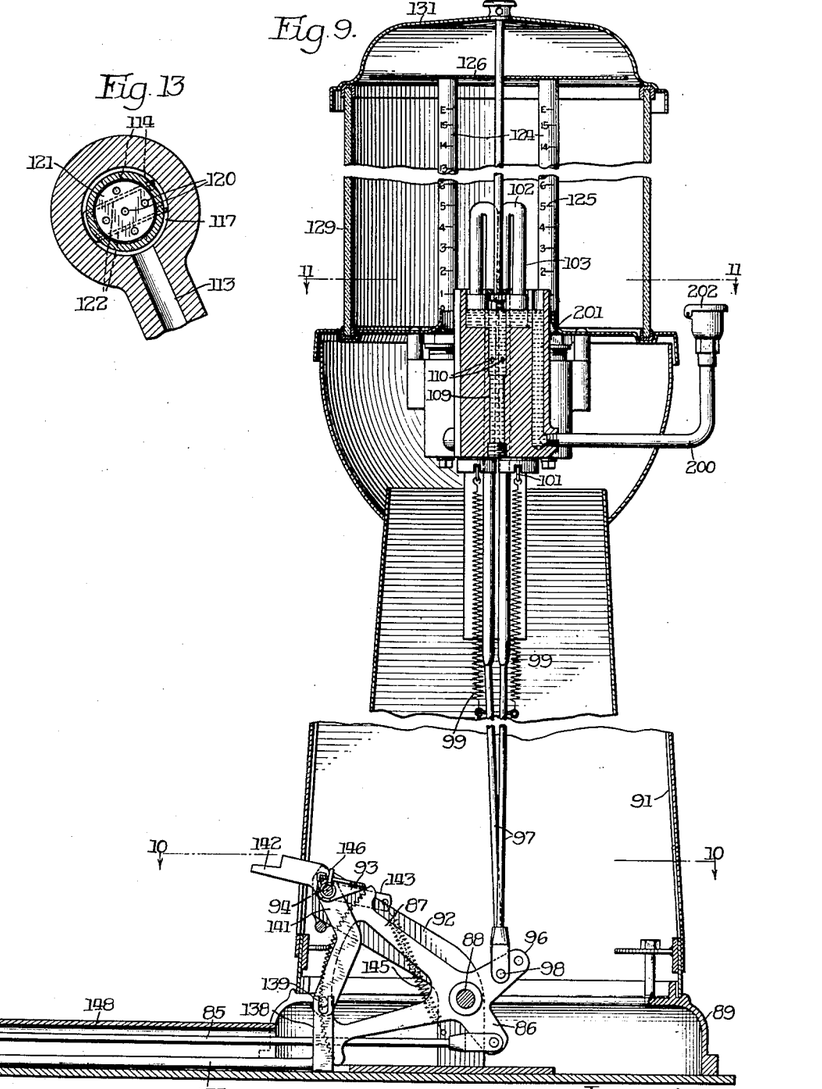
Figure 9 is a central, vertical section through the upright standard and its indicating mechanism.
Figure 13 is an enlarged section on line 13—13 of Figure 12.

Referring to these drawings, particularly Figure 2 thereof, it will be noted that the appliance includes a base-plate, characterized as a whole 21, having a substantially-square portion 22 on which the indicator-standard, shown in Figure 9, is mounted, a long cross-piece 23, and two pairs of extensions 24 and 25 and 26 and 27 projecting therefrom at right-angles thereto.

Two pairs of aligned, horizontal bars 28, 29, 31, and 32 are bolted or riveted at their inner ends at 33 to the base-plate section 23 and their outer extremities are fastened to end-castings 34 and 35 having inclined or sloping tops up which the vehicle-wheels are adapted to roll on to the movable testing or traction plates described below.

These lengthwise bars are also secured together by plates 100 riveted to the end portions of the base-plate sections 24 and 25 and welded at their ends to the longitudinal bars referred to.

In like manner, other flat bars 36, 37, 38 and 39 (Fig. 2) are secured to the base-plate section 23 parallel to the other bars 28, 29, 31 and 32, their intermediate sections being held together by cross-bars 100, and their ends being secured to end-castings 41 and 42 like the parts 34 and 35, the centers of the end-members 34 and 41 and 35 and 42 being spaced apart the distance between the corresponding wheels at opposite sides of the automobile, the brakes of which are to be tested by the apparatus.

Fitted over each of such bars, with its depending flanges at the edges thereof, is a channel-bar 43 equipped with a plurality of slots through its web, each accommodating an anti-friction roller 44 traveling on such lower frame or track-bar 28, for example.

Each such roller-cage bar 43 is connected to the one beside it by a number of suitable cross-bars 40, so that the elements 40 and 43 constitute four, complete cages for the anti-friction rollers.

Each of the four pairs of such track-bars, for example, 28 and 31, is provided with an appropriate cover or wheel plate, such four plates, designated 45, 46, 47 and 48, riding on the corresponding rollers and being roughened on their top faces to prevent the vehicle-wheel tires, while on them, from slipping.

Each such wheel-plate is connected in any approved manner, not shown, to its anti-friction roller cage, whereby the latter is caused to travel one-half the distance which the plate moves.

Such cage moving means form no part of the present invention, which in this regard is outlined sufficiently in the drawings and described above.

Thus as the four wheels of the vehicle are driven up on to the appliance and its four, lengthwise-movable plates from either end of the apparatus, and the brakes are applied to the wheels, the four plates, each supporting its own vehicle-wheel, will tend to move forwardly amounts proportional to the braking efforts exerted on the wheels, provided, as described hereinafter, such movements of the plates are resisted by means about to be described, and which may be registered in an easily inspected portion of the device.

In order to impose resistance or restraint to the lengthwise travel of the plates in either direction of movement when the brakes are applied to the wheels of the vehicle rolling on them, the following specified mechanism has been provided:

A full description of the structure associated with one of the cover or traction plates will suffice for all, as they are all practically or nearly alike.

Extended downwardly from the undersurface of such plate are a pair of transversely and longitudinally spaced lugs or abutments 77 and 78 located opposite shoulders 79 and 81, respectively, of a lever 82 fulcrumed at 83 on the base-plate, the lever being pulled by a spring 84 of suitable strength, attached thereto and to a pin on the base-plate, to rock the lever to hold its shoulders in engagement with their correlated, plate lugs and to resist the travel of the associated traction-plate in either direction.

To keep the four traction-plates, in the unoperated condition of the apparatus, in central or neutral or normal positions, and also to prevent their traveling, when the brakes are applied, an excessive distance greater than that provided for in the apparatus, two, stationary, double-ended stop-plates 149, 149 with upwardly-projecting abutments 151, 152 are mounted on the base-plate, these stops 151 and 152 being in the path of travel of the end portions of the four levers 82 and therefore limiting their extent of rocking action.

Figure 4:
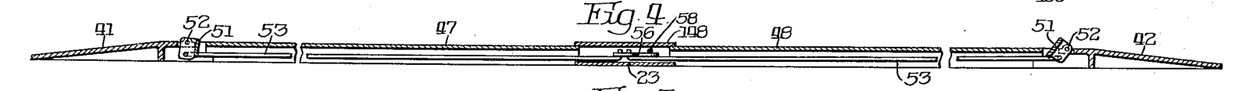
Figure 4 is a longitudinal, vertical section on line 4—4 of Figure 2.
Figure 5:
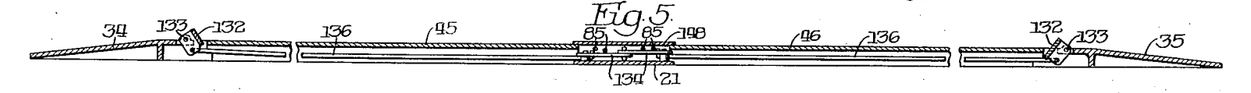
Figure 5 is a lengthwise, vertical section on line 5—5 of Figure 2.
Figure 6:
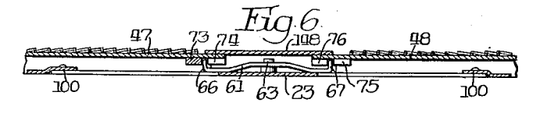
Figure 6 is a fragmentary, vertical section on line 6—6 of Figure 2.
Figure 7:
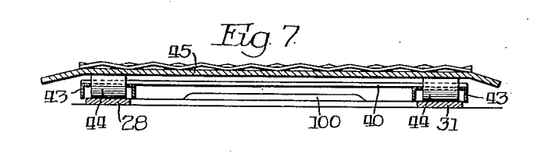
Figure 7 is an enlarged, vertical cross-section on line 7—7 of Figure 2.
Figure 8:
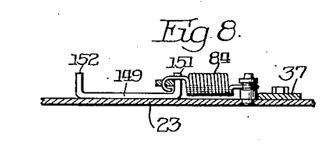
Figure 8 is a fragmentary, enlarged section on line 8—8 of Figure 2.

Each of the opposite end-members 41 and 42 has a cross-bar 51 hinged thereon at 52, 52, such bar being capable of extending or projecting above the top surface of the adjacent traction or cover plate, 47 or 48, as the case may be, one of such bars 51 being shown in the specified, elevated position in Figure 4.

Each such hinged cross-bar 51 is connected by a link 53 (Figure 2) with one arm of a bell-crank lever 56 fulcrumed on the base-plate 21 at 57, the other arm of such lever being joined to the middle portion of a link 58 rockingly connected at its opposite ends to two lock-levers 59 and 61 fulcrumed at their centers at 62 and 63 to the base-plate, the two extremities of each such lever having upwardly-extended, curved ends or lugs 64, 65 and 66, 67, respectively.

Such projection 64 is so positioned as to adapt it to co-operate individually with stops 68 and 69 on, and extended downwardly from, the underside of plate 45, part 65 being similarly adapted to co-act with stops 71 and 72 on plate 46, part 66 with stops 73 and 74 on plate 47, and part 67 with stops 75 and 76 on plate 48.

It should be noted from Figure 4 that the links 53, 53 are of such length that when one cross-bar 51 is raised, the other will be automatically depressed, and vice versa.

If the front wheels of the vehicle, the brakes of which are to be tested, are driven up on the plates 35 and 42, when the left-hand, front wheel rides on to lock-bar 51, provided the latter is in its up position, it will be depressed, rocking bell-crank lever 56 counterclockwise, thereby shifting the two levers 59 and 61 to rock projection or finger 64 directly opposite and to the right of stop 68, projection 65 in similar relation to stop 72, projection 66 in like position with respect to stop 73, and projection 67 in the path of stop 76.

It will be noted that the active faces of the plate stops are curved to conform to the curvature of, and path of travel of, the co-operating, upstanding lever ends or lugs.

Such lock-bar 51 having been swung down by the front wheel of the vehicle, it will stay down, so that when the rear heel rides over it, no useful function will be performed.

If the bar 51 of plate 42 was originally down and the bar 51 at the opposite end of the structure was initially up, then all four plates were originally locked against travel to the right, and neither wheel will effect any change in that relation as the vehicle rolls on to the appliance from the right-hand end.

Thus all four plates, 45, 46, 47, and 48, are positively locked against travel to the right, but they may move freely to the left; that is, in the direction in which the vehicle and its wheels are rolling on the plates.

If the vehicle had been driven on to the plates from the opposite end, then the lock-bar 51 of member 41 would have become operative to lock the plates against movement to the left with freedom of travel to the right, or they would have been preliminarily so locked prior to the driving of the vehicle on to the apparatus, as the case might be.

A link 85, having a nut 80 at one side of an apertured lug 182 upstanding from the lever 82 and through the hole of which lug the link extends, joins each lever 82 to an arm 86 (Figure 9) of a corresponding ratchet-sector 87 rockable on a horizontal shaft 88 mounted in the hollow base 89 of an upright casing or hollow standard 91, the ends of the shaft being supported in brackets 92, 92.

In order that each ratchet-sector may be temporarily maintained in its operated or raised position, a spring-pressed locking or holding pawl or dog 93 co-acting with the teeth of the ratchet-sector is mounted to rock on a shaft 94 oscillatory in bearings 95, 95 in the upper portions of the brackets 92, 92.

Another arm 96 of the ratchet-sector 87 (Figure 9) has the lower end of a rod 97 hinged to it at 98, the rod being pulled upwardly by a coiled, contractile spring 99 connected to it and to a stationary eye or loop 101.

The spring, therefore, tends to lift the rod to rock the ratchet-sector downwardly into its normal or unoperated position, as illustrated in Figure 9.

The upper part of such rod 97 is bent over at 102 (Figure 12) with a portion 103 extended downwardly and pinned or otherwise fastened at 104 to a plunger or piston 105 fitting snugly in, and slidable up and down in, a cylindrical cavity 106 of a suitably-supported casting 107, having, of course, four such plungers and cylindrical recesses corresponding to the four plates of the brake-testing appliance, or to the four wheels of the vehicle on the apparatus.

The bottom of each such cavity 106 is closed by a screw-threaded plug 108 in which the eye or loop 101 may be conveniently mounted.

In its central portion, casting 107 has a liquid supply-chamber or reservoir 109 connected to the four cylinders 106, grouped symmetrically around it, by the corresponding conduits or passages 110, the inner walls of such cylinders, above their pistons or plungers, being slotted or omitted at 111, so that the liquid in the reservoir may readily find access to all of the cylinders both above and below their plungers, each of which, in its underside, has a cavity or recess 112 filled with air to act as a cushion for the liquid.

The interior of the lower end of each cylinder 106 is connected, through a conduit 113 and ports 114 in a supporting flange 115 on the underside of an upright, tubular member 116, with a small chamber 117 inside the flange which is in communication with a larger chamber 118 above by means of a small or restricted port 119, co-operating with which is an apertured disc or valve 121 adapted to rest normally on cross-pins 122, 122 below the port, such valve being illustrated more in detail in Figure 13.

When such disc or valve is resting on its supporting rods or pins 122, the port 119 is fully open, and when the disc or valve is forced up, the port is in large measure, but not completely closed by the disc because the central one of the several holes 120 through the disc is open, such single hole being materially smaller in size than the port 119.

Member 116 fits in, and is mounted in, a cylindrical cavity in an upstanding part 123 of the main casting 107.

Each chamber 118 at its upper end connects with the lower, open end of an upright, glass indicator-tube 124 graduated in any approved manner as at 125, the top ends of the four tubes being normally closed by a disc 126 common to all of them, and provided with indentations 127 fitting in the ends of the tubes and equipped with guides 128 reaching further down into them.

Figures 12, 14:
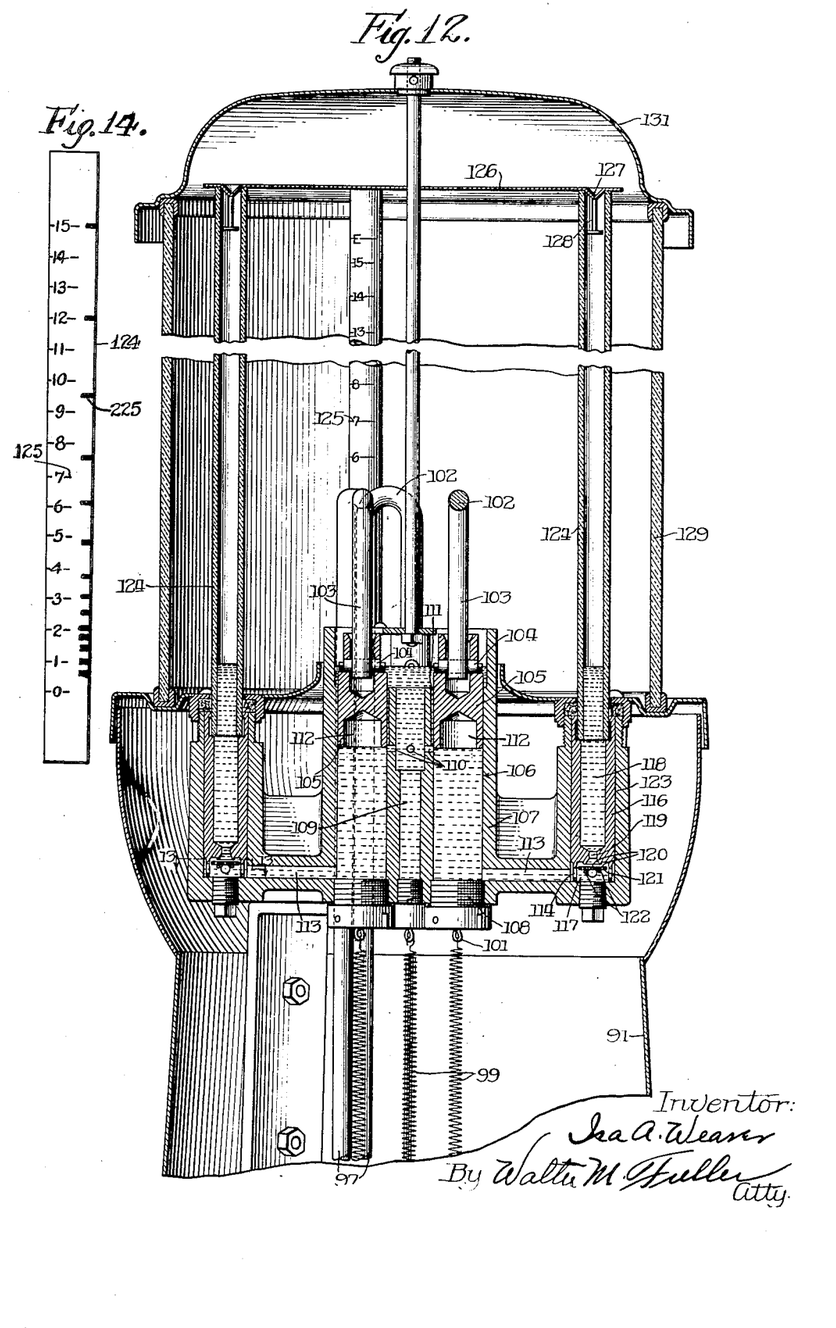
Figure 12 is a vertical section on line 12—12 of Figure 11.
Figure 14 is a face view of one of the gauge tubes provided with two types of graduations.

When the liquid is forced upwardly in the several tubes during the braking action, the disc 126 can rise to permit the ready escape or expulsion of the air from the tubes, and it will then fall back by gravity into its normal position, as shown in Figure 12.

A suitable indicating liquid, colored, if desired, to make it more conspicuous, is introduced into chamber 109, through an inlet-pipe 200 and a connecting passage 201 in casting 107, the top end of the right-angle pipe 200 being normally closed by a hinged cap or cover 202, the upper end of pipe 200 being on a level with the zero graduations of the indicator-tubes 124, so that when the liquid is poured into the appliance through pipe 200 until it begins to overflow at its upper end, there is assurance that the supply-chamber 109 and all of the associated chambers 106, 118, and the lower parts of tubes 124, have been filled with liquid sufficient to cause its surface to register with the zero graduations on all of the tubes.

The four tubes 124 are grouped together in the same general relation as are the four cover or traction plates with which they are individually operatively associated, whereby the occupant of the tested automobile, without leaving his seat in the latter, can readily ascertain the brake adjustments of the four wheels by the heights of the liquids in the several tubes, as explained below.

The upright, indicating tubes 124 and the liquid-operating mechanism described are mounted in a hollow post or standard 91 in any appropriate manner, the tubes being easily visible through a round, glass enclosure 129 covered with a dome top 131.

When the indicating liquid is forced up the graduated tubes by the means described, it will be retained in such tubes by the operating plungers 105 by reason of the action of the locking pawls or dogs 93 on the ratchet-sectors 87, and such liquid is not ordinarily permitted to descend to normal or zero level until the vehicle passes off of the plates on which it has rested, although means are provided so that the operator may release the columns of liquid by the action of his foot.

This indicating liquid release, however, is generally accomplished automatically by the vehicle itself by the means now to be described.

Each plate 45 and 46 at its outer end has a transverse trip-bar 132 hinged thereto at its ends at 133, these bars and their mountings being substantially like those of bars 51, each such trip or release bar 132 being connected to its corresponding one of two levers 134, 134 (Fig. 2), fulcrumed on the base-plate at 135, 135, by a link 136.

Both levers 134 are connected to a single link 137 (Figures 2 and 9), common to both of them, having at its other end a slotted, upstanding arm 138, the slot of which accommodates a pin 139 on a bent pedal 141 fixed on the shaft 94 and having a foot-piece 142, protruding outside of the standard 91, so that the pedal and the shaft may be rocked by the foot or by either one of the trip-bars 132.

Figures 10, 11:
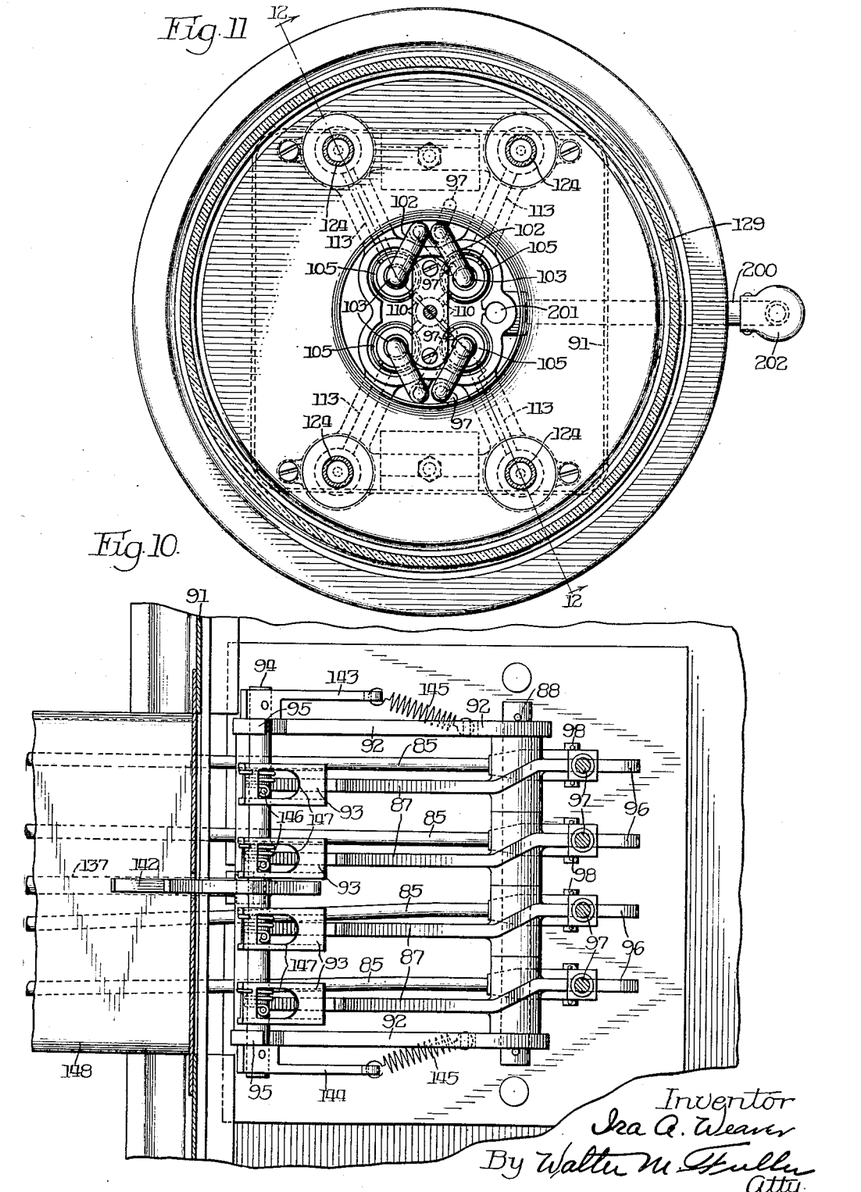
Figure 10 is an enlarged, horizontal section on line 10—10 of Figure 9.
Figure 11 is a horizontal section on an enlarged scale on line 11—11 of Figure 9.

At its opposite ends, shaft 94 has two arms 143, 144 pinned thereto (Figure 10), the extremities of such arms being connected to coiled, contractile springs 145, 145, the other ends of which are secured to the brackets 92, (Figure 9).

These springs, through the specified connected mechanism, normally keep both of the trip-bars 132, 132 elevated and the shaft 94 in the position indicated in Figure 9.

This shaft has four outstanding or radial pins 146, 146, (Figs. 9 and 10), each extended up through an aperture 147 in one of the holding or locking pawls or dogs 93, and, when the shaft is rocked either by the foot-piece 142, or by either trip-bar 132, all four pins will engage the end walls of the pawl slots and will simultaneously lift or rock all four pawls or dogs away from, and thus release, all of the ratchet-sectors, which, under the action of springs 99, permits the automatic restoration or return of the four plungers 105 to their normal, raised positions and the corresponding descent of the liquid levels in the four, graduated indicator-tubes to their zero graduations.

In order to protect the mechanism between the adjacent ends of the traction-plates, a stationary cover-plate 148 of suitable shape and size is employed in the relation indicated in Figures 1 and 3 to 6, inclusive.

The roller cages may be prevented from moving sidewise and also limited as to their lengthwise travel by reason of pin and slot connections 153, 153 between them and the underlying track-plates on which the rollers travel.

Also, the cover-plates may be held in place by headed studs 154 mounted on the track-plates and co-operating with slots 155 in the traction plates, or any other suitable means may be employed for keeping the various parts of the construction in proper position and relation to one another.

Figure 1:
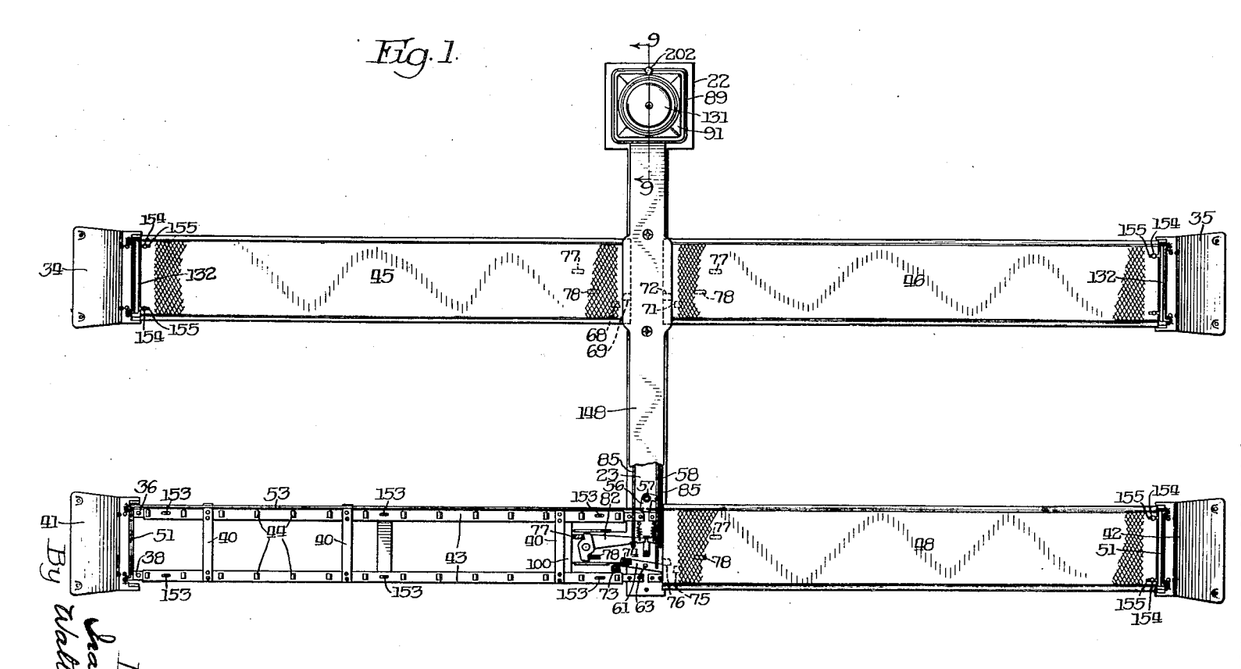
Figure 1 is a plan view of the brake-tester adapted for the trial of the brakes of all four wheels of the vehicle at the same time, one of the cover or traction plates on which one of the wheels is adapted to roll during the testing operation being removed, as well as a portion of one of the other cover-plates to show some of the underlying structure.

The brake-testing appliance thus shown and described operates practically as follows:

Assume that the vehicle, the brakes of which are to be tested, is driven up on to the appliance from the right, as the apparatus is viewed in Figures 1 and 2, and, assume further, that the lock-bar 51 at such end of the appliance is up and that the other lock-bar 51 at the opposite end of the apparatus is down, having been left in this condition during the previous working of the tester.

When the right-hand front wheel momentarily depresses the trip-bar 132 at the right-hand end of the tester, all of the four locking pawls will be momentarily raised, but, inasmuch as at that time none of the ratchet-sectors are in elevated or operated position, having been previously re-set to normal position when the appliance was used before, no useful result is accomplished, and the bar 132 rises again.

When the left-hand front wheel of the vehicle rides over and presses down the corresponding bar 51, the other or companion bar 51 which was previously in its lowered position will be raised and the two levers 59 and 61 will be rocked to bring their ends 64, 65, 66 and 67 opposite and to the right of the corresponding stop lugs 68, 72, 73, and 76, thus locking all four traction-plates 45, 46, 47, and 48 against movement to the right.

Having been thus once set in this position, the levers 59 and 61 will remain therein, while the rear, left wheels run over the already-depressed bar 51 at the right-hand end of the appliance and also during the subsequent brake-testing action.

When the rear, right-hand wheel engages and presses the elevated trip-bar 132 on the end-casting 35 down, all of the locking-dogs 93 will again be raised, but no profitable result will accrue because all of the ratchet-sectors are down in their normal positions.

As the vehicle thus proceeds on the appliance, there will be one wheel on each of the four traction-plates, and while the wheels are rolling thereon, the chauffeur depresses the vehicle brake-pedal and applies all four brakes, the result being that the four traction-plates will be moved along with the vehicle-wheels distances corresponding to the braking effects on such four wheels, such travel of the individual plates being resisted by the action of the four springs 84, one spring functioning in connection with its own particular traction-plate.

As soon as the drags on the plates have terminated, the four springs 84 will automatically contract and thereby effect the restoration of all four plates to their neutral or normal, central positions with the ends of the levers 82 against their stops 151, but the plates cannot pass such central positions because they are locked or prevented from so doing by the lock-levers 59 and 61.

Thus the return of any such plate cannot modify the return of any other plate and cause a false reading of the indicator.

Stated somewhat differently, the appliance tests the several braking forces while the vehicle is travelling forwardly, and an incorrect reading on the indicator is not possible due to conflict of one braking effort with another.

The backing-up braking action on the wheels can be tested, if desired, by backing the vehicle on to the apparatus and applying the brakes while it is so moving.

The specified forward movements only of the four plates will be transmitted through their rods 85 to the four ratchet-sectors which will be swung up amounts or distances proportionate to the braking forces acting on the wheels on the individual plates, and the four plungers or pistons 105 will be pulled down corresponding amounts, forcing harmonizing or comporting quantities of liquid up their respective indicator-tubes 124, and the ratchet-sectors, plungers, and columns of liquid will be maintained in these positions until released, as described below.

Owing to the sliding relation between the lever lugs 182 and the rods or links 85, the traction-plates, under the contracting action of their springs 84, can automatically return to their central, normal positions without affecting the ratchet-sectors or the indicating columns of liquid.

When the liquid passes from the chambers 106 into the chambers 118 and the glass-tubes, it lifts the discs or valves 121, closing the corresponding ports 119, except for the central aperture through each valve, the result being that the passage of the liquid into the glass-tubes is retarded so as to give correct, ultimate readings, and in this way the momentum of the liquid is overcome or compensated for.

The operator having noted the heights of the liquids in the four tubes is apprised thereby of the conditions of the four brakes on the wheels of the vehicle, whereupon he drives the vehicle off of the apparatus toward the left.

When the front, right-hand wheel depresses the trip-bar 132 of the end-casting 34, all of the ratchet-sectors are released by the lifting of their holding-pawls, and, under the influence of their springs 99, they all immediately rock down to original or normal position shown in Figure 9.

At the same time, all of the plungers 105 ascend in their chambers 106 tending to create a vacuum beneath them, thus drawing the liquid columns in the glass-tubes 124 quickly back into the chambers 106, which action is facilitated and hastened because the valves 121 will drop away from the valve-seats around ports 119, so that passage of the liquid through such ports is free and easy as compared with its flow therethrough in the opposite direction, as indicated above.

When the left-hand, front wheel passes over the elevated trip-bar 51 of casting 41, it causes the shifting of the levers 59 and 61 to lock all of the traction-plates from moving to the left, and when such bar 51 moves down, the other bar 51 rocks up.

When the rear, right-hand wheel in passing off of the tester depresses the bar 132 of the end plate 34, all of the holding dogs will be raised again, but nothing will happen otherwise, because all of the ratchet-sectors have previously rocked down to their initial or normal positions.

When the rear, left-hand wheel passes over the bar 51 of the end casting 41, nothing occurs because such bar is already down at that time, having been pushed down by the front, left-hand wheel.

From the foregoing, it will be clear how the apparatus operates when the vehicle is driven over it, moving from left to right, and equally effective and reliable results will be accomplished regardless of the direction in which the vehicle is driven over the appliance.

The indicating-tubes are graduated, as shown, and they may also have markings thereon, arranged on a logarithmetic scale, so that each mark downward is 20% of the next one above, as shown by the scale 225 (Fig. 14) whereby, regardless of the height to which the liquid rises, the viewer can quickly visualize whether the corresponding brakes on the two sides of the car are equalized by the markings on the correlated tubes, either for the front or for the rear wheels of the vehicle. If the percentage scale 225 is employed, as shown in Figure 14, in association with the regular scale 125, the viewer can ascertain at a glance whether or not the brake pressure for the wheels are less or greater than 20% difference. Assuming that the gauge-tube 124, as illustrated in Figure 14, is equally graduated at 125 with the highest mark designated 15, which may represent 1500 pounds, the graduations of the other scale 225 on the percentage basis would be at the approximate locations .8, 1, 1.28, 1.6, 2, 2.5, 3.14, 3.92, 4.9, 6.14, 7.68, 9.6, 12, 15.

If desired, the tubes may be graduated in pound pulls of the wheel on the wheel-plate.

Inasmuch as the cylinders and their pistons are located in the upper portion of the recording head of the standard, no packing is required, and, although the pistons have slightly loose fits in their cylinders, they will, nevertheless, hold the liquid in its elevated positions in the tubes.

Those acquainted with and trained in this art will readily understand that the invention, as defined and specified in the appended claims, is not limited or restricted to the precise or exact mechanical details set forth and that many minor or even major changes may be incorporated in the structure without deviation from the heart or essential features of the invention and without the sacrifice of any of its important advantages.

I claim:

1. In a vehicle-wheel brake-tester, the combination of a movable member on which the vehicle-wheel is adapted to roll in either of opposite directions, means to restrain movement of said member in either of the opposite directions of movement thereof, means to lock said member automatically against travel from its neutral position in the direction opposite that of the travel of the wheel thereon while allowing freedom of travel of the member in the direction of travel of the wheel, and means actuated by the movement of said member to indicate the extent of movement of said member in either direction caused by the application of the vehicle-brake to the wheel.

2. In a vehicle-wheel brake-tester, the combination of a movably-mounted plate on which the vehicle-wheel is adapted to roll in either of opposite directions, means to restrain movement of said plate in either of the opposite directions of travel thereof, means to lock said plate automatically against travel from its neutral position in the direction opposite that of the travel of the wheel thereon while allowing freedom of travel of the plate in the direction of travel of the wheel, and means actuated by the movement of said plate to indicate the extent of movement of the plate in either direction caused by the application of the vehicle-brake to the wheel.

3. In a vehicle-wheel brake-tester, the combination of a movably-mounted plate on which the vehicle-wheel is adapted to roll in either of opposite directions, means to restrain movement of said plate in either of the opposite directions of travel thereof, vehicle-wheel operated means to lock said plate automatically against travel from its neutral position in the direction opposite that of the travel of the wheel thereon while allowing freedom of travel of the plate in the direction of travel of the wheel, and means actuated by the movement of said plate to indicate the extent of movement of the plate in either direction caused by the application of the vehicle-brake to the wheel.

4. In a vehicle-wheel brake-tester, the combination of a base, a plate movable on said base and on which the vehicle-wheel is adapted to roll in either of opposite directions, means to restrain movement of said plate in either of the opposite directions of travel thereof, a movable member adapted to be shifted by the vehicle-wheel, means operated by said movable member to lock said plate automatically against travel from its neutral position in the direction opposite that of the travel of the wheel thereon while allowing freedom of travel of the plate in the direction of travel of the wheel, and means actuated by the movement of said plate to indicate the extent of movement of the plate in either direction caused by the application of the vehicle-brake to the wheel.

5. In a vehicle-wheel brake-tester, the combination of a base, a plate movable on said base in either of opposite directions and on which the vehicle-wheel is adapted to roll in either of opposite directions, means to restrain movement of said plate in either of the opposite directions of travel thereof, a movable member adapted to be shifted by the vehicle-wheel, means operated by said member, including stops on the underside of said plate and a lever fulcrumed on said base and having a lug co-operating with said stops, to lock said plate automatically against travel from its neutral position in the direction opposite that of the travel of the wheel thereon while allowing freedom of travel of the plate in the direction of travel of the wheel, and means actuated by the movement of said plate to indicate the extent of movement of the plate in either direction caused by the application of the vehicle-brake to the wheel.

6. In a vehicle-wheel brake-tester, the combination of a base, a pair of elongated plates mounted on said base and each capable of moving longitudinally in either of opposite directions and on which plates two wheels of the vehicle are adapted to roll simultaneously with one wheel on each plate, means to restrain the movements of said plates in either direction of travel thereof, means operated automatically by one of said wheels to lock both of said plates against travel from their neutral positions in the direction opposite that of the travel of the wheels while allowing freedom of travel of the plates in the direction of the wheel travel, and means actuated by the movements of said plates to indicate individually the extent of movements of said plates in either direction caused by the application of the vehicle-brakes to the wheels while the latter are on said plates.

7. In a vehicle-wheel brake-tester, the combination of a base, a pair of elongated aligned plates mounted on said base each capable of moving longitudinally in either of opposite directions and on which plates two wheels of the vehicle are adapted to roll simultaneously with one wheel on each plate, means to restrain the movements of said plates in either direction of travel, movable wheel-operated means near one end of one plate, movable wheel-operated means near the opposite end of the other plate, means actuated by either of said wheel-operated means to lock both of said plates against travel from their neutral positions in the direction opposite that of the travel of the wheels while allowing freedom of travel of the plates in the direction of the wheel travel, and means actuated by the movements of said plates to indicate individually the extent of movements of said plates in either direction caused by the application of the vehicle-brakes to the wheels while on said plates.

8. In a vehicle-wheel brake-tester, the combination of a base, a pair of parallel elongated plates mounted on said base each capable of moving longitudinally in either of opposite directions and on which plates two wheels of the vehicle are adapted to roll simultaneously with one wheel on each plate, means to restrain the movements of said plates in either direction of travel, means operated automatically by one of said wheels to lock both of said plates against travel from their neutral positions in the direction opposite that of the travel of the wheels while allowing freedom of travel of the plates in the direction of the wheel travel, and means actuated by the movements of said plates to indicate individually the extent of movements of said plates in either direction caused by the application of the vehicle-brakes to the wheels while they are on the plates.

9. In a vehicle-wheel brake-tester, the combination of a base, four elongated plates mounted on said base and each capable of moving longitudinally in either of opposite directions and on which plates the four wheels of a vehicle are adapted to roll simultaneously with one wheel on each plate, means to restrain the movements of said plates in either direction of travel, wheel-operated means automatically locking all of the said plates against travel from their neutral positions in the direction opposite that of the travel of said wheels while allowing freedom of travel of the plates in the direction of the wheel travel regardless in which of opposite directions the vehicle is traveling on the plates, and means actuated by the movements of said plates to indicate individually the extent of movements of said plates in either direction caused by the application of the vehicle-brakes to the wheels while they are on the plates.

10. In a vehicle-wheel brake-tester, the combination of a movably-mounted member on which the vehicle-wheel is adapted to roll, means to restrain movement of said member in the direction of wheel travel thereon, an upright cylinder, a piston slidable in said cylinder, an upright indicator-tube connected to said cylinder below said piston, liquid in said tube and in said cylinder below said piston, means actuated by the movement of said member to force said piston down when said member is moved by the application of the brake to the vehicle-wheel rolling on the member an amount corresponding to the extent of travel of said member, whereby to elevate the liquid-level in said indicator-tube a corresponding amount, means tending to raise said piston to its normal position, means to lock said piston automatically in its final lower position, and means to release said lock to allow said piston-raising means to restore said piston to its normal elevated position, thereby permitting the liquid-level in said tube to descend to its normal position.

11. In a vehicle-wheel brake-tester, the combination of a movably-mounted member on which the vehicle-wheel is adapted to roll, means to restrain movement of said member in the direction of wheel travel thereon, an upright cylinder, a piston slidable in said cylinder, an upright indicator-tube connected to said cylinder below said piston, liquid in said tube and in said cylinder below said piston, means actuated by the movement of said member to force said piston down when said member is moved by the application of the brake to the vehicle-wheel rolling on the member an amount corresponding to the extent of travel of said member, whereby to elevate the liquid-level in said indicator-tube a corresponding amount, means tending to raise said piston to its normal position, means to lock said piston automatically in its final lower position, and means to release said lock to allow said piston-raising means to restore said piston to its normal elevated position, thereby permitting the liquid-level in said tube to descend to its normal position, said piston having an air-cushion chamber in its underside in communication with said liquid.

12. In a vehicle-wheel brake-tester, the combination of a movably-mounted member on which the vehicle-wheel is adapted to roll, means to restrain movement of said member in the direction of wheel travel thereon, an upright cylinder, a piston slidable in said cylinder, an upright indicator-tube connected to said cylinder below said piston, liquid in said tube and in said cylinder below said piston, means actuated by the movement of said member to force said piston down when said member is moved by the application of the brake to the vehicle-wheel rolling on the member an amount corresponding to the extent of travel of said member, whereby to elevate the liquid-level in said indicator-tube a corresponding amount, means tending to raise said piston to its normal position, means to lock said piston automatically in its final lower position, means to release said lock to allow said piston-raising means to restore said piston to its normal elevated position, thereby permitting the liquid-level in said tube to descend to its normal position, and an upright liquid-supply chamber in communication with said cylinder below said piston in the normal unoperated position of the latter.

13. In a vehicle-wheel brake-tester, the combination of a movably-mounted member on which the vehicle-wheel is adapted to roll, means to restrain movement of said member in the direction of wheel travel thereon, an upright cylinder, a piston slidable in said cylinder, an upright indicator-tube connected to said cylinder below said piston, liquid in said tube and in said cylinder below said piston, means actuated by the movement of said member to force said piston down when said member is moved by the application of the brake to the vehicle-wheel rolling on the member an amount corresponding to the extent of travel of said member, whereby to elevate the liquid-travel in said indicator-tube a corresponding amount, means tending to raise said piston to its normal position, means to lock said piston automatically in its final lower position, means to release said lock to allow said piston-raising means to restore said piston to its normal elevated position, thereby permitting the liquid-level in said tube to descend to its normal position, and an upright liquid-supply chamber in communication with said cylinder above said piston in the normal unoperated position of the latter.

14. In a vehicle-wheel brake-tester, the combination of a movably-mounted member on which the vehicle-wheel is adapted to roll, means to restrain movement of said member in the direction of wheel travel thereon, an upright cylinder, a piston slidable in said cylinder, an upright graduated indicator-tube connected to said cylinder below said piston, liquid in said tube and in said cylinder below said piston, means actuated by the movement of said member to force said piston down when said member is moved by the application of the brake to the vehicle-wheel rolling on the member an amount corresponding to the extent of travel of said member, whereby to elevate the liquid-level in said indicator-tube a corresponding amount, means tending to raise said piston to its normal position, means to lock said piston automatically in its final lower position, means to release said lock to allow said piston-raising means to restore said piston to its normal elevated position, thereby permitting the liquid-level in said tube to descend to its normal position, and an upright liquid-supply chamber in communication with said cylinder and equipped with an overflow on a level with the zero graduation of said indicator-tube.

15. In a vehicle-wheel brake-tester, the combination of a movably-mounted member on which the vehicle-wheel is adapted to roll, means to restrain movement of said member in the direction of wheel travel thereon, an upright cylinder, a piston slidable in said cylinder, an upright indicator-tube connected to said cylinder below said piston, liquid in said tube and in said cylinder below said piston, means actuated by the movement of said member and having a sliding connection with said piston to force said piston down when said member is moved by the application of the brake to the vehicle-wheel rolling on the member an amount corresponding to the extent of travel of said member, whereby to elevate the liquid-level in said indicator-tube a corresponding amount, means tending to raise said piston to its normal position, means to lock said piston automatically in its final lower position, and means to release said lock to allow said piston-raising means to restore said piston to its normal elevated position, thereby permitting the liquid-level in said tube to descend to its normal position, said piston-forcing means by reason of said sliding connection permitting said member to return to its normal unoperated position while allowing said lock to hold said piston in its operated position.

16. In a vehicle-wheel brake-tester, the combination of a movably-mounted member on which the vehicle-wheel is adapted to roll, means to restrain movement of said member in the direction of wheel travel thereon, an upright cylinder, a piston slidable in said cylinder, an upright indicator-tube connected to said cylinder below said piston through a restricted port, liquid in said tube and in said cylinder below said piston, means actuated by the movement of said member to force said piston down when said member is moved by the application of the brake to the vehicle-wheel rolling on the member an amount corresponding to the extent of travel of said member, whereby to elevate the liquid-level in said indicator-tube a corresponding amount, means tending to raise said piston to its normal position, means to lock said piston automatically in its final lower position, means to release said lock to allow said piston-raising means to restore said piston to its normal elevated position, thereby permitting the liquid-level in said tube to descend to its normal position, and a valve co-operating with said port and actuated by said liquid to reduce the passage through said port during the descent of said piston and to increase the passage through said port upon ascent of the piston.

17. In a vehicle-wheel brake-tester, the combination of a plurality of movably-mounted members on which the vehicle-wheels are adapted to roll, means to restrain movement of said members in the direction of wheel travel thereon, a gauge for each of said members, and means operatively connecting said members with their corresponding gauges, whereby when the brakes of a vehicle whose wheels are rolling over said members are applied to said wheels said gauges will indicate the respective amounts of such braking actions, said gauges being graduated so that each graduation is the same definite percentage of the next higher graduation.

In witness whereof I have hereunto set my hand.

IRA A. WEAVER.